Patented Aug. 26, 1952

2,608,536

UNITED STATES PATENT OFFICE 2,608,536

CELLULAR RESINS

Robert F. Sterling, Pittsburgh, Pa., assignor to Westinghouse Electric Corporation, East Pittsburgh, Pa., a corporation of Pennsylvania No Drawing. Application January 17, 1950, Serial No. 139,133

9 Claims. (Cl. 260—2.5)

This invention relates to compositions that are capable of producing a cellular expanded thermoset body when heated, and to the process for producing the cellular expanded body and the resulting product.

It has long been desirable to produce cellular expanded resin bodies from thermoset resins in such manner that the expansion may be controlled to provide for any desired density of cellular product. Furthermore, it has been held desirable to provide a composition in fluid form that may be introduced into a form, mold or space and upon subjecting the fluid composition to a simple and inexpensive treatment, the composition will expand as a foam that thermosets into a cellular structure.

Heretofore, it has been known to prepare cellular products from resinous materials, but the process of securing the expanded product has been costly and difficult to apply for many purposes. In many cases, the resinous compositions have required processing in expensive equipment apart from the space to which the final cellular resin product is to be applied. Such expanded masses often required machining or forming to adapt them to the space to be filled. Such processes obviously are inherently costly and inconvenient.

The object of this invention is to provide a resinous fluid composition that may be introduced into any space and upon a simple heat-treatment, the composition foams into a cellular mass of a predetermined density and thermosets.

A further object of the invention is to provide a process for producing an expanded cellular thermoset resin by applying a predetermined temperature to a fluid resinous composition whereupon the fluid foams into an expanded cellular mass and thermosets.

A still further object of the invention is to provide articles of manufacture embodying a casing, and within the casing there is disposed a thermoset cellular expanded resinous body adherent to the walls of the casing.

Other objects of the invention will in part be obvious, and will in part appear hereinafter.

For a better understanding of the nature and objects of the invention, reference should be had to the following detailed description.

In accordance with this invention, I have produced a resinous composition that is relatively stable at room temperature so that it may be stored for periods of time, and the composition may be subjected to heating at predetermined temperatures whereupon it expands into a foamed cellular structure whose density is dependent upon the temperature of the heating. After expanding the cellular body thermosets promptly into a rigid structure. The composition is composed of (a) between 70 and 95 parts by weight of a thermosetting, partially reacted aqueous reaction product of certain monohydric phenols and certain aldehydes, (b) between 5 parts and .1 part of a surface active organic foam-increasing agent, (c) between 0.5 and 15 parts by weight of at least one gas-evolving nitrogenous compound selected from the group consisting of organic nitrates and azo compounds, and (d) from 1 to 30 parts by weight of an organic diisocyanate. The composition is prepared by admixing the four compounds above described at room temperature or lower. It is stable for long periods of time of the order of a week if kept below temperatures of 90° F. When refrigerated at temperatures of below 30° F., it is stable for even longer periods of time.

The phenol-aldehyde resin (a) of the composition is a specific product. It is prepared by reacting one mol of at least one monohydric phenol selected from the group consisting of phenol (monohydroxy benzene), cresol, xylenol and cresylic acid, with from one to three mols of at least one aldehyde selected from the group consisting of formaldehyde, polymers of formaldehyde, acetaldehyde, hexamethylene tetramine and furfuraldehyde. The reaction is carried out in the presence of substantial quantities of water. The phenol and the aldehyde are reacted with an alkaline catalyst in the proportions of from 0.05% to 5% of the weight of the phenol. Any conventional alkaline catalyst suitable for promoting the reaction of phenol and formaldehyde may be employed. Examples of such catalysts are sodium hydroxide, potassium hydroxide, barium hydroxide, calcium hydroxide, calcium oxide, sodium carbonate, sodium bicarbonate, barium carbonate, ethylene diamine, propylene diamine, ammonia, hexamethylene tetramine, and aniline. It will be appreciated that other alkali and alkaline-earth metal, oxides, hydroxides, carbonates, bicarbonates, and primary and secondary aliphatic and aryl amines may be employed. The reaction of the phenol and aldehyde may be carried out in the temperature range of between 50° C. and 125° C., with or without refluxing, for a period of time of from one-half hour using the maximum amount of the catalyst and the highest temperatures to as much as twenty hours or longer using the least amount of catalyst and the lowest reaction temperatures. The sufficiency of the reaction is determined by the nature of the resulting product as will be set forth.

After the reaction product has been initially reacted, it is dehydrated by applying a vacuum to remove excessive water. It may be desired, though not necessary, to reduce the alkalinity of the reaction product, or even render it acidic, by treating the resin with an acid before the dehydration. Thus, the resinous product which may have a pH of as high as about 11 may be treated with an acid to reduce the pH to as low as 3. For reducing the pH of the resin it has been found that organic acids such as lactic acid, tartaric acid, citric acid, acetic acid, oxalic acid, maleic anhydride, malonic acid, phenol sulfonic acid, and formic acid give good results. Mineral acids such as hydrochloric, sulfuric, and phosphoric also may be added to the reaction product to reduce the pH. In any event the resinous composition may have a pH of from 3 to about 11, while being suitable for the practice of the invention. The dehydration of the resinous product is carried out to remove only a part of the water and to leave in the resinous product between 3% and 25% by weight of water, the balance being the partially reacted phenol-aldehyde resin. With this amount of water, the resin composition should have a viscosity of between 1 and 250 poises as measured at 25° C. Excellent low density expanded cellular bodies have been obtained when the viscosity of the resinous product was between 10 and 50 poises. The dehydration may be carried out at a vacuum of from five inches of mercury absolute pressure or lower with a temperature during vacuum dehydration varying from 50° C. to 100° C. The cooled product after the partial dehydration is a liquid aqueous composition that is stable for prolonged periods of time and need only be combined with the required amount of the diisocyanate and either a nitrate or an azo compound or both, and a surface active agent to render it foamable and then thermosettable upon heating.

Numerous surface active organic foam-increasing agents may be employed in the practice of the invention. Particularly satisfactory results have been obtained with the alkyl alkaline sulfosuccinates in which each alkyl group has between four and twenty-four carbon atoms. The dibutyl, dihexyl and dioctyl sodium sulfosuccinates and octadecyl disodium sulfosuccinamate are suitable for use in producing low density foams. Another satisfactory group of foam-increasing agents are the alkyl aryl alkaline sulfates and sulfonates wherein there is present an alkyl group having from four to thirty carbon atoms. Examples of this group are dodecyl benzene sodium sulfonate, octyl naphthalene sodium sulfonate, dodecyl benzene ethanolamine sulfonate, monobutylphenyl-phenol sodium monosulfonate, monobutyl biphenyl sodium sulfonate, and the sodium salt of sulfated octoic acid ester of naphthol. Alkyl aryl polyether alcohols and alkyl aryl polyether sulfonates in which the alkyl group has from eight to twenty-four carbon atoms may be used. Examples of this group are the octadecyl phenol ethylene oxide condensation product and the polymers of such product, the sodium salt of dodecyl phenol ethylene oxide, and the sodium salt of decyl phenol ethylene oxide sulfate. The manufacture of members of this group of compounds is disclosed in detail in Patents 2,454,541-2-3-4. The alkaline soaps of fatty acids having from twelve to twenty-four carbon atoms may be employed in preparing the compositions. Examples of such soaps are sodium stearate, potassium oleate, triethanolamine palmitate, aminoethanolamine oleate, and ammonium laurate. The sorbitan esters of acids having from twelve to twenty-four carbon atoms are suitable surface active agents. Examples thereof are sorbitan monolaurate and sorbitan trioleate. Another group of foam-increasing agents comprises the polyoxyalkylene sorbitan esters of acids containing from twelve to twenty-four carbon atoms. Examples of these compounds are polyoxyethylene sorbitan monolaurate, polyoxyethylene sorbitan tristearate, polyoxyethylene sorbitol monolaurate, and polyoxyethylene sorbitol pentaoleate. The alkyl and alkaryl quaternary ammonium halide compounds wherein at least one alkyl group of the former has from eight to twenty-four carbon atoms and at least one alkaryl group in the latter totals from eight to twenty-four carbon atoms are suitable for use in the composition. Examples of such quaternary ammonium compounds are cetyl dimethyl benzyl ammonium chloride, octadecyl dimethyl benzyl ammonium chloride, octadecanol-9-dimethyl ethyl ammonium bromide, and diisobutylphenoxy-ethoxy ethyl dimethyl benzyl ammonium chloride. Another excellent group of foam-increasing agents comprises the alkyl sulfates and sulfonates wherein the alkyl groups have from eight to thirty carbon atoms. Examples thereof are lauryl sodium sulfate, sodium sulfated monoglyceride of oleic acid, octadecanol sodium sulfate, octyl alcohol potassium sulfate, lauryl methanol sulfonate, and sodium petroleum sulfonate. The sulfated and sulfonated alkyl amines and amides wherein there is at least one alkyl group having from eight to twenty-four carbon atoms have been employed with success. Examples of this group are triethanolamine oleate sulfate, butyl amine salt of dodecyl benzene sulfonic acid, and the sodium salt of the sulfonated reaction product of oleyl chloride and methyl taurine, having the formula

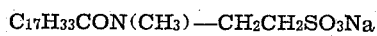

$$C_{17}H_{33}CON(CH_3)-CH_2CH_2SO_3Na$$

The gas-evolving nitrogenous compound may be selected from organic nitrates and azo compounds. Various organic nitrates have proven satisfactory. Cellulose nitrate has been used with success. Ammonium nitrate and phenyl nitrate are other suitable nitrates. Example of azo compounds are azobenzene, diazoaminobenzene, and paraamino azobenzene.

The organic diisocyanate is exemplified by hexamethylene diisocyanate, phenylene diisocyanate, and methylene bis-4-phenylene diisocyanate.

The following examples illustrate the preparation and utilization of the compositions of the invention:

*Example I*

A phenol-aldehyde resin was prepared by reacting one mol of phenol with two and one-half mols of formaldehyde (40% aqueous), in the presence of 0.05 mol of sodium hydroxide. The composition was reacted for two hours at 77° C. to 88° C. The composition was neutralized with lactic acid to a pH of six and then dehydrated under twenty-eight inches of mercury vacuum to a viscosity of 36 poises. The composition contained approximately 10% of water.

A foamable composition was prepared from this phenol-formaldehyde resin in the following proportions by weight:

| | Percent |
|---|---|
| Phenol-formaldehyde resin composition | 83 |
| Dioctyl sodium sulfosuccinate | 2 |
| Methylene bis-4-phenyl diisocyanate | 11 |
| Diazoaminobenzene | 4 |

This composition is well stirred until all of the ingredients are thoroughly admixed with one another, and the resulting mixture was poured into a form and heated to a temperature of above 150° C. In a few minutes at this temperature, the composition began to foam and expand vigorously and filled the mold. By heating to a temperature in the range of between 175° C. and 225° C., the lowest density materials of between 0.7 and 1 pound per cubic foot were produced. To produce a stronger, more dense cellular product, a temperature of from 130° C. to 160° C. may be employed. In approximately ten minutes the entire cellular mass had been completely polymerized.

Example II

A phenol-formaldehyde resin prepared as under Example I was prepared and a foamable composition prepared therefrom as follows:

| | Percent |
|---|---|
| Phenol-formaldehyde resin composition | 83 |
| A mixture of potassium and ammonium oleates, stearates, and palmitates | 2 |
| Hexamethylene diisocyanate | 10 |
| Cellulose nitrate | 5 |

This mixture was prepared by dissolving the soap in the resin then adding the other ingredients and admixing thoroughly. After heating at a temperature of above 150° C., a fine textured cellular thermoset resinous body was produced.

Example III

A partially reacted phenolic resin was prepared by reacting one mol of cresylic acid with 1.25 mols of 40% aqueous formaldehyde in the presence of 0.1%, based on the weight of the cresylic acid, of ethylene diamine as a catalyst. After refluxing for thirteen minutes, the product was dehydrated under vacuum to a viscosity of 15 poises at 25° C. The composition had approximately 15% by weight of water present.

A foamable composition was prepared from the resin of this example in the following proportions:

| | Percent |
|---|---|
| The cresylic acid-formaldehyde resin | 83 |
| Octadecyl phenol ethylene oxide condensation product | 2 |
| Methylene bis-4-phenyl diisocyanate | 9 |
| Diazoaminobenzene | 6 |

After being thoroughly admixed, the composition was placed in a mold and heated to a temperature of 200° C. It produced an even textured thermoset foamed body of a density of approximately 1 pound per cubic foot.

Example IV

The following were reacted:

1 mol of phenol
2 mols acetaldehyde
Sodium hydroxide 1¼% based on weight of the phenol The mixture was heated for six hours over a temperature range of from 75° C. to 92° C. Thereafter the reaction product was acidified with acetic acid to a pH of 6.5 and dehydrated under a vacuum of twenty-seven inches of mercury. The viscosity of the product was approximately 2½ poises. The water content of the product was approximately .22%. This resin was used in the following mixture

| | Percent |
|---|---|
| Phenol-aldehyde resin composition | 80 |
| 2-decyl benzene sodium sulfonate | 1 |
| Tolylene diisocyanate | 10 |
| Cellulose nitrate | 9 |

After being thoroughly admixed, the composition was placed within a form and when heated to a temperature of from 130° C. to 250° C., it expanded rapidly into a cellular mass and thermoset.

The expanded cellular products of the present invention have been molded into various shapes and forms, such for example as slabs and star-shaped members, and have been found to fill and penetrate the forms in which they were cast. Thermal conductivity tests of the panels have given thermal conductivity values of as low as 0.2 B. t. u. per hour per square foot per °F. per inch.

In order to provide for somewhat tougher cellular walls in the expanded resin, there may be included in the expansible composition in an amount of not over 8% of its weight of at least one thermoplastic resin selected from the group consisting of polyvinyl esters, polyvinylals which are derived by reacting a hydrolyzed polyvinyl ester with an aldehyde, cellulose esters, cellulose ethers, polyvinylidene chloride, polyacrylates, polymers of acrylic acid esters and polymers of alkyl acrylic acid esters. Specific examples of the above that may be employed are polyvinyl butyral, polyvinyl acetate, polyvinylidene chloride, polyvinyl alcohol (for example, the 80% hydrolysis product of polyvinyl acetate), and polymethylmethacrylate.

Plasticity may be imparted to the phenolaldehyde resin by incorporation during the refluxing period of up to ½ mol of a polyhydric alcohol per mol of phenol. Suitable polyhydric alcohols are glycerol and aliphatic liquid glycols of up to eight carbon atoms.

To secure a predetermined texture or to strengthen the cellular thermoset composition, there may be added to the composition prior to its heat treatment, an amount not exceeding 10% of the weight of the composition of finely divided inert solids. Finely divided silica flour, wood flour, walnut shell flour, asbestos fibers, silical gel, acetylene black, aluminum powder and mica are examples of suitable materials. Wood flour and finely divided cotton fibers in particular enable a tougher, stronger cellular product to be produced.

The compositions as set forth herein have proved to be extremely useful in the preparation of thermal insulation, particularly for refrigerated cabinets.

The compositions of the present invention may be applied to various structures to provide for heat insulation thereof by pouring the liquid foamable composition between the walls of refrigerators and similar apparatus and placing the apparatus in an oven or subjecting it to heat, and upon the temperature reaching 130° C. and higher, the compositions will begin to foam and expand to an extent determined by the temperature. By applying a suitable amount of the liquid composition and employing a proper temperature, the spaces may be completely filled. The compositions in foaming have been found to adhere to metal, wood and other construction materials, and upon thermosetting they are bonded to the walls of the casings. Spaces in refrigerators that are obstructed by cross members and the like are difficult to treat with conventional types of cork or glass wool insulation. However, the foamable compositions of the present invention operate satisfactorily since the foam will penetrate apertures and by-pass constructions. For example, prefabricated metal wall sections that have been connected by braces and cross members are completely and readily insulated by applying an amount of the liquid composition thereto and heating the wall section. The expanded resinous composition envelops and surrounds all the bracing and adheres to the walls and such spacing members. The compositions are corrosion resistant and possess this advantage when applied to metallic casings.

Members having utility in buoyancy applications are particularly readily constructed by the use of the compositions of the present invention. Floats, vessels and the like may be prepared by filling a shell with the cellular composition generated in place from a predetermined amount of the fluid composition. Non-sinkable boats and the like of extremely light weight may be constructed from the compositions using laminated wood, metal or reinforced plastic disposed as a hollow shell in which the composition is expanded. The cellular compositions are rot-proof and vermin-proof. They also protect metal surfaces to which they are applied from corrosion.

For some purposes, it may be desirable to form molded cellular thermoset bodies of predetermined density. Metal molds or forms of suitable size and shape may be lined with a sheet of paper or cellophane or the like and a selected amount of the fluid expansible composition placed in the lined mold. Upon heating the mold and the contained composition to a predetermined temperature, the composition will expand into the thermoset cellular structure. Thereafter, the expanded cellular structure may be readily removed from the mold because of the presence of the paper or cellophane liner. The mold may be relined and reused.

Since certain obvious changes may be made in the above procedure and different embodiments of the invention could be made without departing from the scope thereof, it is intended that all matter contained in the above description and drawing shall be taken in connection with the accompanying claims and not in a limiting sense.

I claim as my invention:

1. The method of preparing a cellular expanded thermoset resinous body comprising admixing (a) between 70 and 95 parts by weight of a thermosettable partially reacted aqueous reaction product of one mol of at least one monohydric phenol selected from the group consisting of phenol, cresol, xylenol and cresylic acid and from 1 to 3 mols of an aldehyde selected from the group consisting of formaldehyde, polymers of formaldehyde, acetaldehyde, hexamethylene tetramine and furfuraldehyde, the reaction being carried out in the presence of from 0.05% to 5%, based on the weight of the phenol, of an alkaline catalyst for the reaction, and in the presence of substantial amounts of water at a temperature of between 50° C. and 115° C. for a period of time of between ½ and 20 hours, and then vacuum dehydrating the reaction product while maintaining it at a pH of between 3 and about 11 to provide a resinous product containing between 3% and 25% by weight of water and having a viscosity of between 1 and 250 poises, (b) between 5 and 0.1 part by weight of at least one surface active, organic foam-increasing agent selected from the group consisting of alkyl alkaline sulfosuccinates, in which there is an alkyl group having from 4 to 24 carbon atoms, alkyl aryl sulfates and sulfonates wherein the alkyl groups have from 4 to 30 carbon atoms, alkyl aryl polyether alcohols and alkyl aryl polyether sulfonates in which the alkyl group has from 8 to 24 carbon atoms, alkali soaps of fatty acids having from 12 to 24 carbon atoms, polyoxyalkylene sorbitan esters of acids containing from 12 to 24 carbon atoms, sorbitan esters of acids having from 12 to 24 carbon atoms, alkyl and alkaryl quaternary ammonium halide compounds wherein at least one alkyl group of the former has from 8 to 24 carbon atoms and at least one alkaryl group in the latter totals from 8 to 24 carbon atoms, alkyl sulfates and sulfonates wherein the alkyl groups have from 8 to 30 carbon atoms, and sulfated and sulfonated alkyl amines and amides wherein there is at least one alkyl group having from 8 to 24 carbon atoms, (c) between 0.5 and 15 parts by weight of at least one gas-evolving nitrogenous compound selected from the group consisting of organic nitrates and azo compounds, and (d) from 1 to 30 parts by weight of an organic hydrocarbon diisocyanate, and heating the mixture to a temperature of between 130° C. to 250° C. whereby it expands into a cellular structure and thermosets in such expanded state.

2. The process of claim 1, wherein there is added to the mixture, before heating, up to 8% of its weight of at least one thermoplastic resin selected from the group consisting of polyvinylals, polyvinyl esters, hydrolysis products of polyvinyl esters, cellulose esters and ethers, polyvinylidene chloride, polymers of acrylic acid esters and alkyl acrylic acid esters.

3. The process of claim 1, wherein the partially reacted reaction product is combined with up to 0.5 mol of a polyhydric alcohol selected from the group consisting of glycerol and aliphatic liquid glycols having up to 8 carbon atoms.

4. The process of claim 1 wherein there is added to the mixture, before heating, not over 10% of its weight of finely divided inert solids.

5. The cellular, expanded thermoset resinous body produced by the process of claim 1.

6. The cellular, expanded thermoset body produced by the process of claim 2.

7. The cellular, expanded thermoset body produced by the process of claim 3.

8. The cellular, expanded thermoset body produced by the process of claim 4.

9. A composition suitable for preparing thermoset cellular resinous bodies comprising (a) between 70 and 95 parts by weight of a thermosettable partially reacted aqueous reaction product of one mol of at least one monohydric phenol selected from the group consisting of phenol, cresol, xylenol and cresylic acid and from 1 to 3 mols of an aldehyde selected from the group consisting of formaldehyde, polymers of formaldehyde, acetaldehyde, hexamethylene tetramine and furfuraldehyde, the reaction being carried out in the presence of from 0.05% to 5%, based on the weight of the phenol, of an alkaline catalyst for the reaction, and in the presence of substantial amounts of water at a temperature of between 50° C. and 115° C. for a period of time of between ½ and 20 hours, and then vacuum dehydrating the reaction product to provide a resinous product containing between 3% and 25% by weight of water and having a viscosity of between 1 and 250 poises, (b) between 5 and 0.1 part by weight of at least one surface active, organic foam-increasing agent selected from the group consisting of alkyl alkaline sulfosuccinates, in which there is one alkyl group having from 4 to 24 carbon atoms, alkyl aryl sulfates and sulfonates wherein the alkyl groups have from 4 to 30 carbon atoms, alkyl aryl polyether alcohols and alkyl aryl polyether sulfonates in which the alkyl group has from 8 to 24 carbon atoms, alkali soaps of fatty acids having from 12 to 24 carbon atoms, polyoxyalkylene sorbitan esters of acids containing from 12 to 24 carbon atoms, sorbitan esters of acids having from 12 to 24 carbon atoms, alkyl and alkaryl quaternary ammonium halide compounds wherein at least one alkyl group of the former has from 8 to 24 carbon atoms and at least one alkaryl group in the latter totals from 8 to 24 carbon atoms, alkyl alkaline sulfates and sulfonates wherein the alkyl groups have from 8 to 30 carbon atoms, and sulfated and sulfonated alkyl amines and amides wherein there is at least one alkyl group having from 8 to 24 carbon atoms, (c) between 0.5 and 15 parts by weight of at least one gas-evolving nitrogenous compound selected from the group consisting of organic nitrates and azo compounds, and (d) from 1 to 30 parts by weight of an organic hydrocarbon diisocyanate.

ROBERT F. STERLING.

REFERENCES CITED

The following references are of record in the file of this patent:

UNITED STATES PATENTS

| Number | Name | Date |
|---|---|---|
| 2,261,459 | Cooper et al. | Nov. 4, 1941 |
| 2,349,756 | Pratt | May 23, 1944 |
| 2,446,429 | Nelson et al. | Aug. 3, 1948 |

FOREIGN PATENTS

| Number | Country | Date |
|---|---|---|
| 583,796 | Great Britain | Dec. 31, 1946 |

OTHER REFERENCES

De Bell: "German Plastics Practice," pages 463 and 464, pub. 1946, by De Bell and Richardson.